United States Patent [19]

McGehee

[11] Patent Number: 4,512,285

[45] Date of Patent: Apr. 23, 1985

[54] APPARATUS AND METHOD FOR EGG TURNING DURING INCUBATION

[75] Inventor: R. Stephen McGehee, Savannah, Ga.

[73] Assignee: Gof Manufacturing Company, Inc., Savannah, Ga.

[21] Appl. No.: 566,117

[22] Filed: Dec. 27, 1983

[51] Int. Cl.³ .............................................. A01K 41/06
[52] U.S. Cl. ...................................................... 119/44
[58] Field of Search ........................................... 119/44

[56] References Cited

U.S. PATENT DOCUMENTS

| | | | |
|---|---|---|---|
| 1,460,602 | 7/1923 | Peterman | 119/44 |
| 1,773,896 | 8/1930 | Jackson | 119/44 |
| 1,976,159 | 10/1934 | Bridge | 119/44 |
| 3,669,075 | 6/1972 | Marsh | 119/44 |

Primary Examiner—Hugh R. Chamblee

Attorney, Agent, or Firm—Jones & Askew

[57] ABSTRACT

There is provided apparatus for egg turning during incubation, comprising a plurality of egg trays, each having axially opposed pivots being aligned along a selected axis of rotation, support means for rotatively supporting said trays at said pivots, respectively, and oscillator means integral to said support means and said trays for continuously and smoothly oscillating said trays at a selected frequency through a selected angle about said axes of rotation, respectively. Preferably, said support means comprises a rack with a tray holding area for interchangeable trays in closely spaced, side-by-side relation and wherein said oscillator means is mounted closely alongside said tray holding area. Associated methods for egg turning are also provided, which are especially adapted for still-air incubation of a mix of egg species.

4 Claims, 6 Drawing Figures

APPARATUS AND METHOD FOR EGG TURNING DURING INCUBATION

BACKGROUND OF THE INVENTION

This invention relates generally to egg turning during incubation, and relates particularly to a portable, automatic egg turner, being especially adapted for use in still-air incubators, and to methods for continuous egg turning.

During egg incubation, it is known to be advantageous to shift in periodic manner the orientation of the incubating eggs to supply fresh albumen to the growing embryo within each egg and to produce proper muscular movement of the developing fowl inside the eggshell by avoiding sticking of the fowl to the eggshell. Incubators are provided with apparatus for supporting one or more tiers of egg trays and for rocking the egg trays back and forth in a see-saw-like motion.

Circulated air incubators are provided with means for circulating the atmosphere within the incubator to maintain evenness of air temperature. Still-air incubators are those not having air circulation means and because of their relative simplicity are compact and relatively economical. The fertile egg hatch rate associated with still-air incubators is generally significantly less than that associated with circulated air incubators, due in part to the impracticality of using egg turning apparatus within compact still-air incubators. The present invention is especially concerned with egg turning in still-air incubators.

Conventionally, automatic egg turners for incubators are actuated in an intermittent fashion, such that the drive means of the egg turner is intermittently activated to turn the eggs to one side and then deactivated so that the eggs are allowed to rest on that side, etc. Such intermittent egg turning is characterized by a time period of motion that is substantially less than the period of the overall turning cycle. To carry out this irregular motion during a turning cycle, automatic intermittent turners require additional apparatus for timing beyond that required for actual turning. Manually actuated egg turners are inherently intermittent for practical reasons. Various examples of intermittent egg turners are given in U.S. Pat. Nos. 2,625,906; 3,669,075; 2,782,759; 1,638,803; and 962,594.

SUMMARY OF THE INVENTION

It is an object of the invention to provide a simplified, compact automatic egg turner such that egg turning in conjunction with still-air incubation is made practical.

It is another object to provide for egg turning based on a smoothly continuous turning cycle.

It is a further object to provide for egg turning that accommodates a mix of various egg species.

The invention is directed to turning eggs during incubation continuously and smoothly at a relatively slow rate such that movement is not readily apparent. Such slow continuous turning permits substantially simplified automatic drive means associated with the egg turner, which in turn provides for a compact, economical configuration. It is especially adapted for economical and effective use in still-air incubators to provide a fertile egg hatch rate comparable to that obtained in commercial scale circulated-air incubators having relatively complex automatic egg turning apparatus.

According to the apparatus aspects of the invention, there is provided apparatus for egg turning during incubation, comprising a plurality of egg trays, each having axially opposed pivots being aligned along a selected axis of rotation, support means for rotatively supporting said trays at said pivots, respectively; and oscillator means integral to said support means and said trays for continuously and smoothly oscillating said trays at a selected frequency through a selected angle about said axes of rotation, respectively.

Advantageously, said support means comprises a rack with a tray holding area for interchangeable trays in closely spaced, side-by-side relation and wherein said oscillator means is mounted closely alongside said tray holding area.

Preferably, said oscillator means comprises a turn crank at one of said pivots on each of said trays, a motor having a rotative output drive crank, and a substantially minimal reciprocating linkage between said drive crank and said turn cranks.

According to the method aspects of the invention, there is provided a method for egg turning during incubation, comprising rotatively supporting each of a plurality of egg trays along a selected axis of rotation, and continuously and smoothly oscillating said trays unitarily at a selected frequency through a selected angle about their respective axes of rotation.

Advantageously, said frequency and said angle are relatedly selected to enhance incubation hatch rate, which method is particularly adaptable to unitary incubation of a plurality of egg species, preferably in conjunction with still-air incubation.

BRIEF DESCRIPTION OF DRAWINGS

Further details are given below with reference to the drawings wherein.

DESCRIPTION OF THE PREFERRED EMBODIMENTS

It has been discovered that by utilizing a smoothly continuous egg turning cycle during incubation that an automatic egg turner is made available in a practical sense for still-air incubators, and that such turning according to relatedly selected parameters of oscillation angle and frequency during still-air incubation achieves a hatch rate comparable to that obtained in commercial scale incubators.

The phrase "continuously and smoothly oscillating" and similar terms are intended to refer to egg turning wherein there is no substantial period of nonmovement during any given turning cycle, under normal operating conditions.

Figure 1:
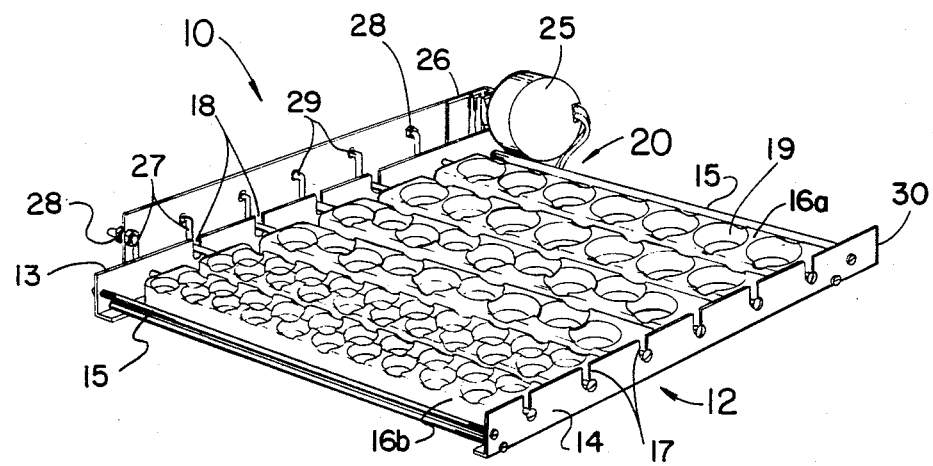
FIG. 1 is a perspective view of a preferred embodiment of the present invention for a portable, automatic egg turner with a variety of interchangeable egg trays.

In FIG. 1, there is shown in perspective a preferred egg turner 10 holding a variety of interchangeable egg trays in a closely spaced side-by-side array. The egg turner includes a supporting rack 12 having a first side member 13 and a second side member 14 held in fixed parallel relation by sets of cross members 15 at each end of a tray holding area 20 between the side members. A plurality of egg trays 16 are rotatively supported between side members 13 and 14. Such rotative support is respectively provided at slots 17 in side member 14 and slots 18 in side member 13. Each tray has pivots at its ends which are axially opposed along the longitudinal axis of the tray. Each tray has a longitudinal series of egg holding receptacles 19. The various trays in egg holding area 20 are interchangeable among the various pivotal positions since sets of pivotal supports 17, 18 are regularly spaced along the side members 13, 14 respectively and since each tray has substantially the same exterior dimensions. It will be noted that a selected mix of egg types may be simultaneously and unitarily incubated since trays of varying egg holding capacity may be interchanged throughout the egg holding area 20. Oscillating means for unitarily turning the egg trays is mounted on rack 12 external to and closely alongside of egg holding area 20 so that a closely arranged array of trays may be accommodated thereby enhancing utilization of a given incubator. The oscillating means as shown comprises a driving motor 25 acting through a reciprocating linkage 26 in communication with a turn crank 27 on each tray. Turn cranks associated with the trays at each end of the array are secured to the reciprocating linkage 26 with nuts 28 on a threaded end of the respective turn cranks. Intermediate turn cranks 29 need not be secured since nuts 28 fix the spatial relationship of linkage 26 to all the trays in the tray holding ara. It is preferred to adhere a strip of tape along the length and near the top of side member 14 beginning for example at 30 so as to prevent the array of egg trays from falling out of the rack should the rack be turned upside down during handling.

Figure 2:
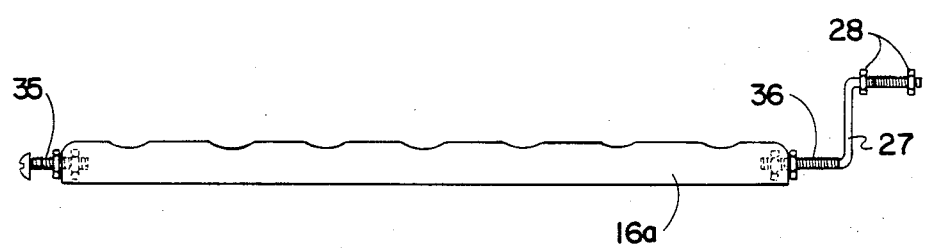
FIG. 2 is a side view of one of said interchangeable egg trays.

In FIG. 2, there is shown a longitudinal side view of egg tray 16 showing pivots at each end and a turning crank at one end integral to the respective pivot. Tray 16 preferably is of molded plastic material thus being lightweight and relatively inexpensive, the molded feature providing a convenient means to construct trays of various egg holding capacity. Egg tray 16 has at one end for rotative support in rack side member 14 pivot 35 which may be conveniently a double nut and bolt arrangement, as shown, such that the double nuts are tightened on either side of the end of tray 16 leaving a protruding segment of the bolt to the outside of the tray for insertion in slot 17 of rack side member 14. At the other end of tray 16 pivot 36 is shown being a similar arrangement except that the bolt is extended and shaped as a crank 27 with the end of the crank being threaded for optional placement of retaining nut 28. Pivots 35, 36 are aligned so as to lie substantially upon a rotationally stable longitudinal axis of tray 16, so that upon mounting a tray in the egg rack, the trays do not tend to eccentrically rotate, thereby promoting smoothness during egg turning. As an optional feature, pivots 35, 36 along with turning crank 27 may be of molded plastic material simultaneously formed with and integral to molded tray 16.

Figure 3:
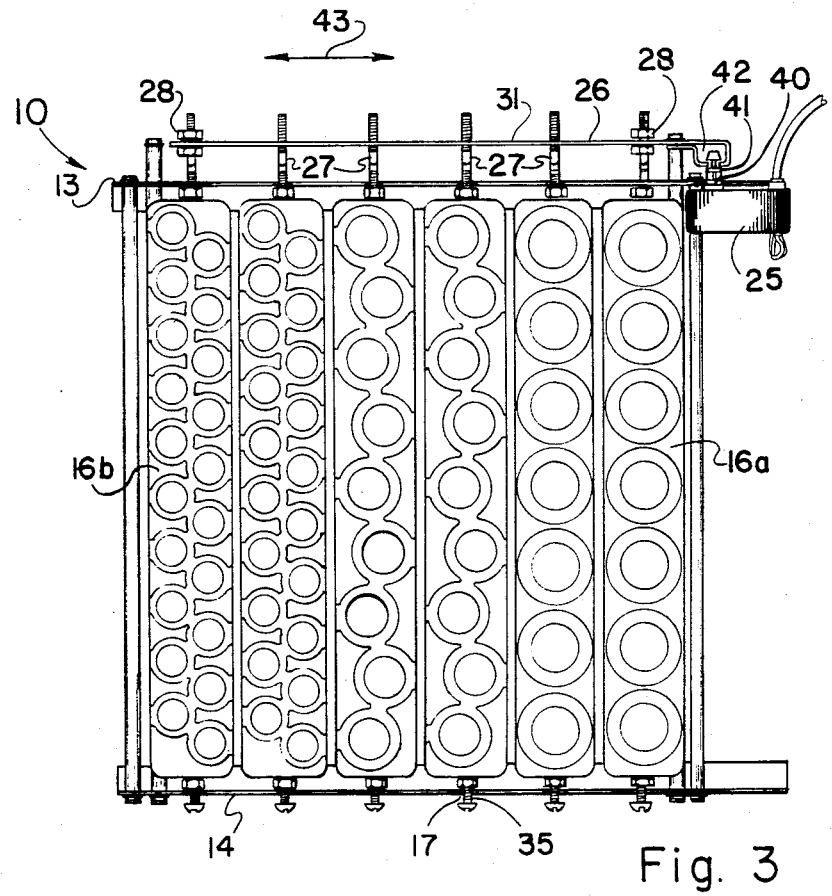
FIG. 3 is a top view of FIG. 1.

In FIG. 3 there is shown a top view of egg turner 10 to more particularly show its oscillating means. A conventional electric motor 25 has an output drive shaft 40 of selected rotational output speed corresponding to the desired period of the turning cycle. Affixed to output shaft 40 is drive crank 41 which reciprocates in channel 42 with each revolution of drive shaft 40. The periodic rotational motion of drive crank 41 in channel 42 reciprocates linkage bar 31 back and forth in the directions indicated by arrows 43. In response to the reciprocating travel 43, linkage bar 31 oscillates turn cranks 27 back and forth through a selected oscillation angle, as further discussed below. Reciprocating linkage 26 is considered to be substantially minimal in that it has only two elements, channel 42 on bar 31 which unitarily actuates all of turn cranks 27. The frequency of oscillation is determined by the rotational speed of drive crank 41, while the oscillation angle of each of turn cranks 27 is determined by the radius of drive crank 41 and the radius of each turn crank 27 relative to that of crank 41. Thus, by selectively adjusting these parameters frequency of turning and angle of turning may be predetermined as desired.

Figure 4A:
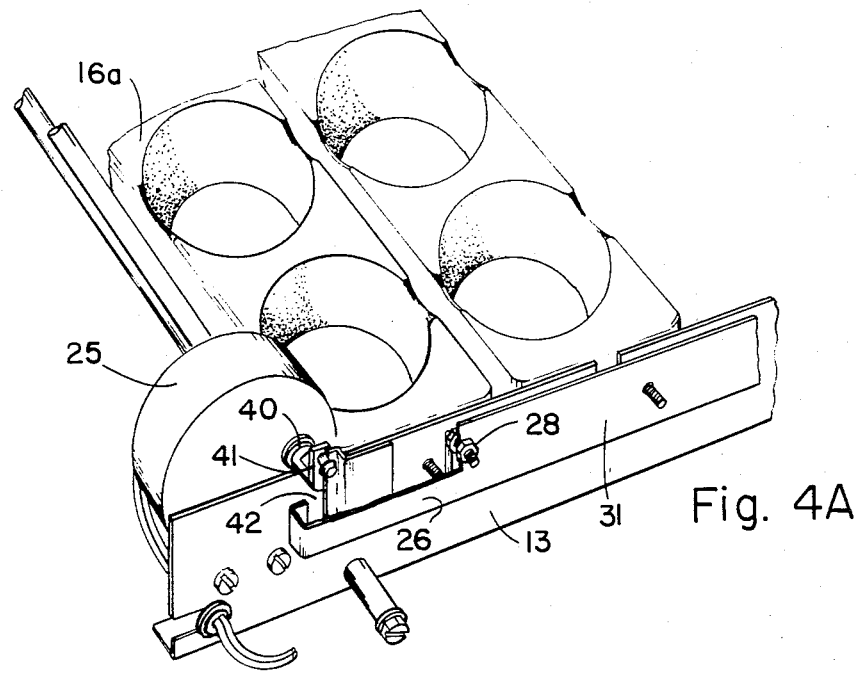
FIGS. 4A, 4B, 4C, illustrate an operational sequence during an egg turning cycle of said embodiment.
Figure 4B:
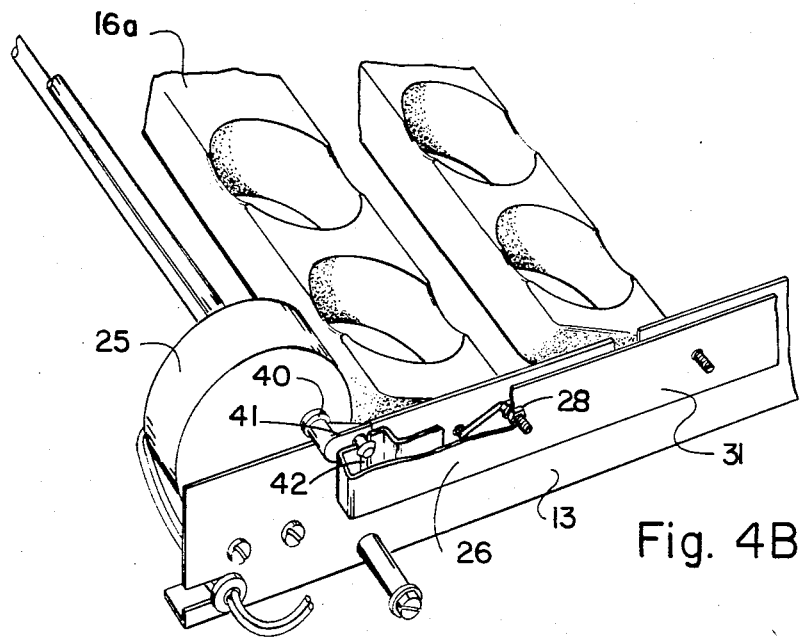
Figure 4C:
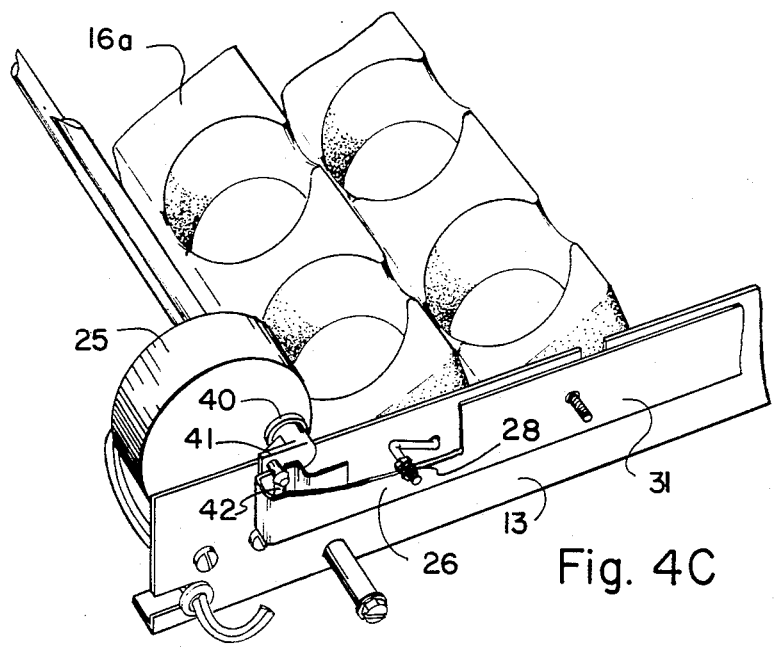

In FIGS. 4A, 4B, 4C, there is illustrated an operational sequence during an egg turning cycle actuated by the foregoing oscillating means. For example, as shown in FIG. 4A, with the drive crank 41 being in the 12 o'clock position, the racks are all aligned horizontally. As the cycle advances by turning of the drive crank to the 3 o'clock position, as shown in FIG. 4B, the trays are simultaneously turned to the right through a selected angle of rotation from the vertical. Then as drive crank 41 continues its rotational path around to the 6 o'clock position the egg trays are brought back to their initial position. With further rotation of drive crank 41 around to the 9 o'clock position, as shown in FIG. 4C, the trays are continuously inclined to the left by the same selected inclination, i.e. the 3 o'clock and 9 o'clock positions are symmetrical. And finally as drive crank 41 returns to its 12 o'clock position the trays are once again brought back to their horizontal position. The angle of oscillation is selected in the range of about plus and minus 25° to 60° of the plane of an egg tray from horizontal. In other words, the oscillation angle is the maximum inclination of an egg tray from the horizontal. For example, the oscillation angle as shown in FIG. 4B is about plus 40°, and in FIG. 4C about minus 40°. The upper inclination limit of about 60° insures that the eggs will not fall from the trays at the maximum point of turning. The lower limit of about 25° insures that there will be sufficient rocking motion to provide the degree of disturbance internal to the eggs to enhance the biological processes during incubation. The frequency of an egg turning cycle is selected in the range of about 0.5 cycle per day to 2 cycles per hour. In general, the selected frequency must produce sufficient disturbance within the incubating egg for enhancing embryo development, but not so much as to have a detrimental effect. An important aspect of the invention provides that the frequency and the angle of oscillation be relatedly selected as a set within the foregoing ranges, respectively, to substantially optimize hatch rate, even when a variety of egg species are unitarily incubated. By virtue of the continuous nature of the egg turning of the invention, another control parameter is made available, i.e. frequency of rotation. Also, in effect a third control parameter is made available in that frequency and oscillation angle advantageously may be related selected as a set. Preferably, the frequency of oscillation is selected in the range of about 1 cycle per 6 hours to 1 cycle per hour and, in combination, the inclination angle will be in the range of about 28° to 34°, especially in conjunction with still-air incubation of quail eggs.

In practice, the egg turner of the invention provides fertile egg hatch rates in conjunction with still-air incubators that approach hatch rates typically obtained in commercial scale circulated air incubators with intermittent egg turning devices. Representatively, hatch rates are obtained in the range of about 80–90% of fertile eggs placed for quail, pheasant, and/or chicken eggs using conventional still-air incubators. Thus, the invention provides an economical way of operating inexpensive still-air incubators so as to obtain commercial scale hatch rates.

Since the egg turner is a compact, integral unit, it is considered to be portable in that it is interchangeable among a variety of still-air incubators, which are widely available. Representatively, Hova-Bator ™ incubators are available from GQF Manufacturing Company, Savannah, Ga.

Although the present invention has been described in conjunction with preferred embodiments, it is to be understood that modifications and variations may be utilized without departing from the principles and scope of the invention as defined by the claims below.

I claim:

1. A method for egg turning during incubation, comprising:
    rotatively supporting along a selected axis of rotation each of a plurality of egg trays; and
    continuously and smoothly oscillating said trays unitarily at a selected frequency through a selected angle about their respective axes of rotation, such that there is no substantial period of nonmovement of said trays during operation; and
    wherein said frequency is selected in the range of about one cycle per two days to two cycles per hour and said angle is selected in the range of about plus and minus 25 to 60 degrees, further provided that said frequency and said angle are relatedly selected to substantially optimize incubation hatch rate.

2. The method of claim 1 wherein said frequency is selected in the range of about 1 cycle per 6 hours to 1 cycle per hour and said angle is selected in the range of about plus and minus 28° to 34°.

3. The method of claim 1 conducted in conjunction with unitary incubation of a plurality of egg species.

4. The method of claim 1 conducted in conjunction with still-air incubation.

* * * * *